(12) United States Patent
Borlick et al.

(10) Patent No.: US 10,545,553 B2
(45) Date of Patent: *Jan. 28, 2020

(54) PREVENTING UNEXPECTED POWER-UP FAILURES OF HARDWARE COMPONENTS

(71) Applicant: International Business Machines Corporation, Armonk, NY (US)

(72) Inventors: Matthew G. Borlick, Tucson, AZ (US); Brian J. Cagno, Tucson, AZ (US); Lokesh M. Gupta, Tucson, AZ (US); Karl A. Nielsen, Tucson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/640,176

(22) Filed: Jun. 30, 2017

(65) Prior Publication Data

US 2019/0004581 A1 Jan. 3, 2019

(51) Int. Cl.
*G06F 1/30* (2006.01)
*G06F 1/26* (2006.01)
(Continued)

(52) U.S. Cl.
CPC .............. *G06F 1/305* (2013.01); *G06F 1/266* (2013.01); *G06F 1/28* (2013.01); *G06F 11/2033* (2013.01);
(Continued)

(58) Field of Classification Search
CPC ............. G06F 11/2094; G06F 11/2033; G06F 11/2092; G06F 11/2023; G06F 1/24; G06F 1/305; G06F 1/28; G06F 11/2284
(Continued)

(56) References Cited

U.S. PATENT DOCUMENTS

| 7,774,633 | B1* | 8/2010 | Harrenstien | G06F 1/24 713/300 |
| 8,959,402 | B2* | 2/2015 | Giddi | G06F 11/0742 714/47.2 |

(Continued)

OTHER PUBLICATIONS

IBM, "Dynamic System Reconfiguration to Provide Redundancy," IP.com, Prior Art Database Technical Disclosure, Dec. 4, 2008, pp. 3.

(Continued)

*Primary Examiner* — Ji H Bae
(74) *Attorney, Agent, or Firm* — Zilka-Kotab, P.C.

(57) ABSTRACT

In one embodiment, a method includes determining a plurality of hardware components of a system. The method also includes power cycling a first hardware component of the plurality of hardware components of the system according to a dynamic schedule. Also, the method includes determining whether the first hardware component experienced a power-up failure resulting from the power cycling. Moreover, the method includes outputting an indication to replace and/or repair the first hardware component in response to a determination that the first hardware component experienced the power-up failure resulting from the power cycling. Other systems, methods, ad computer program products for preventing unexpected power-up failures of individual hardware components are described in accordance with more embodiments.

17 Claims, 7 Drawing Sheets

(51) Int. Cl.
*G06F 1/28* (2006.01)
*G06F 11/22* (2006.01)
*G06F 11/20* (2006.01)
*G06F 1/24* (2006.01)

(52) U.S. Cl.
CPC ...... *G06F 11/2092* (2013.01); *G06F 11/2094* (2013.01); *G06F 11/2284* (2013.01); *G06F 1/24* (2013.01); *G06F 11/2023* (2013.01)

(58) Field of Classification Search
USPC .................................. 713/330; 714/6.3, 11
See application file for complete search history.

(56) References Cited

U.S. PATENT DOCUMENTS

| | | | |
|---|---|---|---|
| 9,058,574 B2 | 6/2015 | Moliere et al. | |
| 9,110,805 B1 | 8/2015 | Tsai | |
| 9,189,309 B1 | 11/2015 | Ma et al. | |
| 9,250,676 B2 | 2/2016 | Lucas et al. | |
| 9,411,913 B2 | 8/2016 | Zhan et al. | |
| 2003/0098879 A1* | 5/2003 | Mathews | G06F 11/3688 715/762 |
| 2006/0031716 A1* | 2/2006 | Chen | G06F 11/2284 714/36 |
| 2006/0048017 A1* | 3/2006 | Anerousis | G06F 11/1438 714/47.2 |
| 2006/0107107 A1* | 5/2006 | Michaelis | G06F 11/1641 714/11 |
| 2006/0136684 A1* | 6/2006 | Le | G06F 1/3203 711/154 |
| 2008/0201616 A1* | 8/2008 | Ashmore | G06F 11/0727 714/57 |
| 2016/0092242 A1* | 3/2016 | Krishnamoorthy | G06F 9/4401 713/2 |
| 2017/0060707 A1* | 3/2017 | Harper | G06F 11/2033 |
| 2019/0354158 A1 | 11/2019 | Borlick et al. | |

OTHER PUBLICATIONS

Anonymous, "Test Automation Scheduling Optimization," IP.com, Prior Art Database Technical Disclosure, Jan. 24, 2017, pp. 7.
Blum et al., IBM DS8880 Architecture and Implementation (Release 8.2.1), Redbooks, ibm.com/redbooks, Jan. 2017, pp. 470.
Borlick et al., U.S. Appl. No. 16/525,342, filed Jul. 29, 2019.

* cited by examiner

PREVENTING UNEXPECTED POWER-UP FAILURES OF HARDWARE COMPONENTS

BACKGROUND

The present invention relates to power-up failures experienced in complex computing systems, and more particularly, to preventing unexpected power-up failures of individual hardware components of complex computing systems.

All computing systems are subject to failures and malfunctions from time to time. Some failures may be foreseeable and preventable, while some others may be random, unexpected and ultimately unresolvable. Moreover, some failures may be based on software, firmware, or some other hard or soft-coded logic issue, while other failures may be hardware-based. Within these hardware-based failures, there is a subset that are only detected when a device is initially powered on, such as when a Power On Self Test (POST) is run on the device initially after powering on the device. In a fully redundant system, these hardware-based failures may be dealt with without loss of data or access to data, as long as the failures on the redundant components performing the same task occur at different times.

However, when a system loses input power (e.g., a site-wide power outage), all devices lose power at the same time and this selective powering-down is not possible. Thereafter, as the system powers back up, components and devices within the system, including redundant devices, may detect failures during this power-up process, and in response to such power-up failures being detected, the system is not able to fully come online in a timely manner because hardware failures are detected at the same time. This inability to bring the system fully back online in a timely manner after a power loss is a significant problem for enterprise-level Information Technology (IT) data centers.

SUMMARY

In one embodiment, a method includes determining a plurality of hardware components of a system. The method also includes power cycling a first hardware component of the plurality of hardware components of the system according to a dynamic schedule. Also, the method includes determining whether the first hardware component experienced a power-up failure resulting from the power cycling. Moreover, the method includes outputting an indication to replace and/or repair the first hardware component in response to a determination that the first hardware component experienced the power-up failure resulting from the power cycling.

In another embodiment, a computer program product includes a computer readable storage medium having program instructions embodied therewith. The computer readable storage medium is not a transitory signal per se. Also, the embodied program instructions are executable by a processing circuit to cause the processing circuit to determine, by the processing circuit, a plurality of hardware components of a system. The embodied program instructions are also executable by the processing circuit to cause the processing circuit to power cycle, by the processing circuit, a first hardware component of the plurality of hardware components of the system according to a dynamic schedule. Also, the embodied program instructions are executable by the processing circuit to cause the processing circuit to determine, by the processing circuit, whether the first hardware component experienced a power-up failure resulting from the power cycle. Moreover, the embodied program instructions are executable by the processing circuit to cause the processing circuit to output, by the processing circuit, an indication to replace and/or repair the first hardware component in response to a determination that the first hardware component experienced the power-up failure resulting from the power cycle.

In yet another embodiment, a system includes a processing circuit, a memory, and logic stored to the memory. When the logic is executed by the processing circuit, it causes the processing circuit to determine a plurality of hardware components of a system. Also, the logic causes the processing circuit to power cycle a first hardware component of the plurality of hardware components of the system according to a dynamic schedule. In addition, the logic causes the processing circuit to determine whether the first hardware component experienced a power-up failure resulting from the power cycle. Moreover, the logic causes the processing circuit to output an indication to replace and/or repair the first hardware component in response to a determination that the first hardware component experienced the power-up failure resulting from the power cycle.

Other aspects and embodiments of the present invention will become apparent from the following detailed description, which, when taken in conjunction with the drawings, illustrate by way of example the principles of the invention.

DETAILED DESCRIPTION

Figure 1:
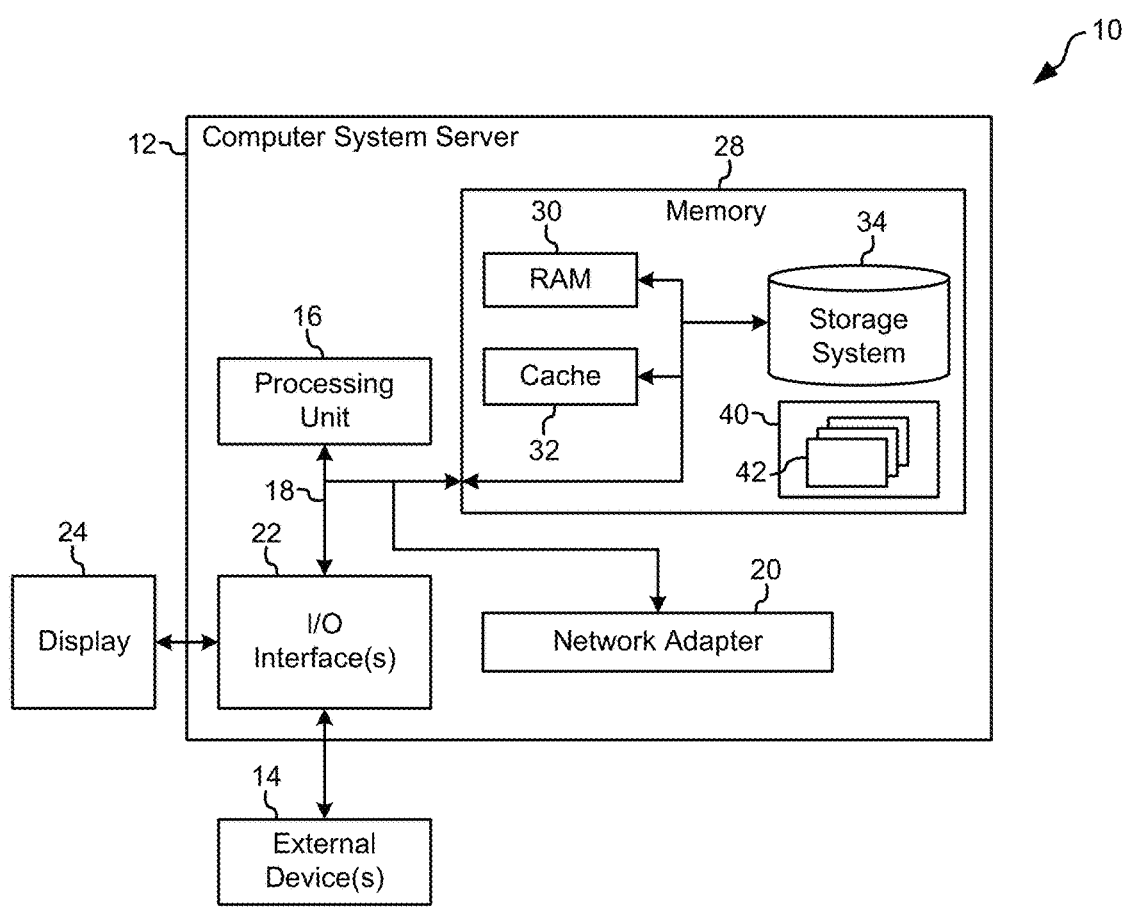
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for power cycling hardware components of a computing system during periods of time in which data loss will not occur and operational readiness will not be adversely effected.

In one general embodiment, a method includes determining a plurality of hardware components of a system. The method also includes power cycling a first hardware component of the plurality of hardware components of the system according to a dynamic schedule. Also, the method includes determining whether the first hardware component experienced a power-up failure resulting from the power cycling. Moreover, the method includes outputting an indication to replace and/or repair the first hardware component in response to a determination that the first hardware component experienced the power-up failure resulting from the power cycling.

In another general embodiment, a computer program product includes a computer readable storage medium having program instructions embodied therewith. The computer readable storage medium is not a transitory signal per se. Also, the embodied program instructions are executable by a processing circuit to cause the processing circuit to determine, by the processing circuit, a plurality of hardware components of a system. The embodied program instructions are also executable by the processing circuit to cause the processing circuit to power cycle, by the processing circuit, a first hardware component of the plurality of hardware components of the system according to a dynamic schedule. Also, the embodied program instructions are executable by the processing circuit to cause the processing circuit to determine, by the processing circuit, whether the first hardware component experienced a power-up failure resulting from the power cycle. Moreover, the embodied program instructions are executable by the processing circuit to cause the processing circuit to output, by the processing circuit, an indication to replace and/or repair the first hardware component in response to a determination that the first hardware component experienced the power-up failure resulting from the power cycle.

In yet another general embodiment, a system includes a processing circuit, a memory, and logic stored to the memory. When the logic is executed by the processing circuit, it causes the processing circuit to determine a plurality of hardware components of a system. Also, the logic causes the processing circuit to power cycle a first hardware component of the plurality of hardware components of the system according to a dynamic schedule. In addition, the logic causes the processing circuit to determine whether the first hardware component experienced a power-up failure resulting from the power cycle. Moreover, the logic causes the processing circuit to output an indication to replace and/or repair the first hardware component in response to a determination that the first hardware component experienced the power-up failure resulting from the power cycle.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
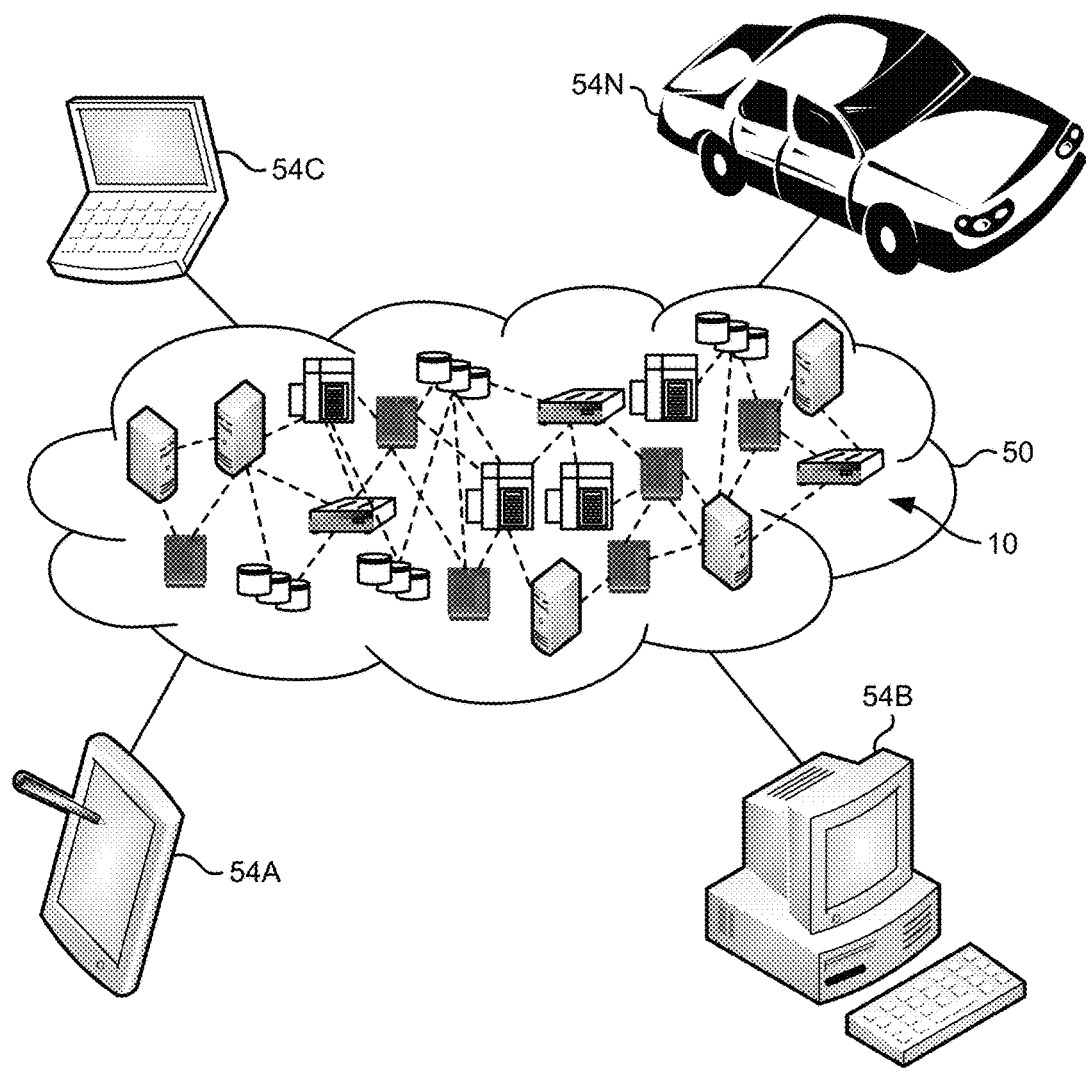
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
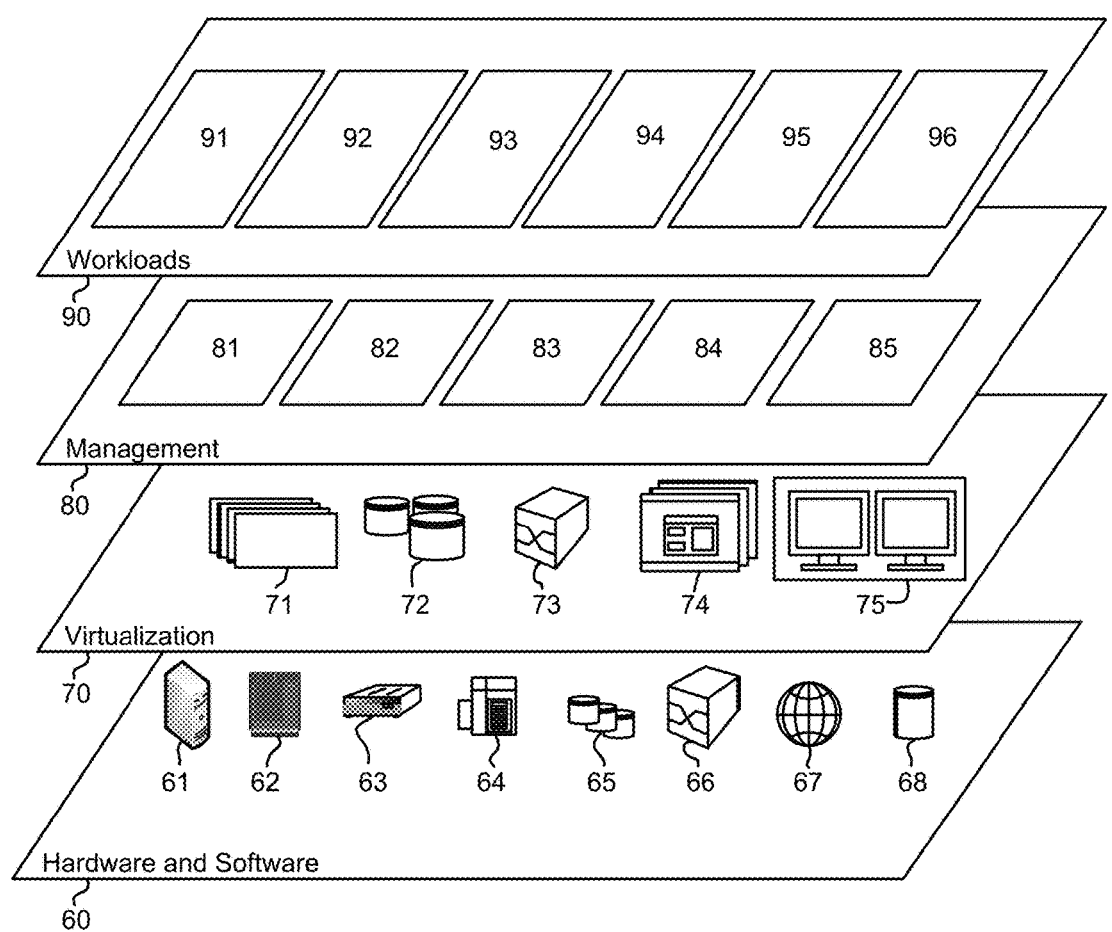
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power-up failure mitigation 96.

Figure 4:
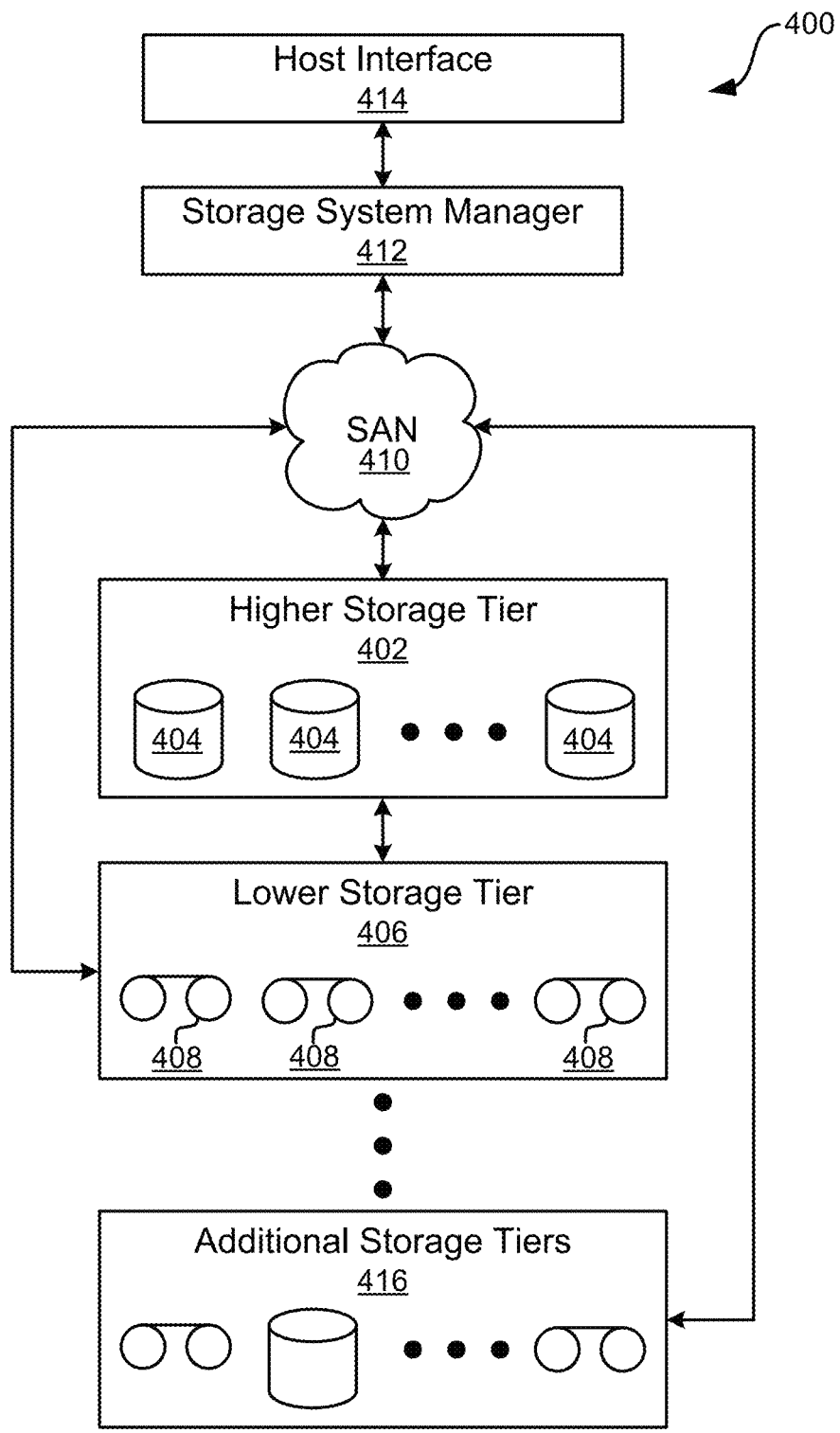
FIG. 4 illustrates a tiered data storage system in accordance with one embodiment.

Now referring to FIG. 4, a tiered storage system 400 is shown according to one embodiment, which may be representative of a public tiered object store in some approaches. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 406 may preferably include one or more lower performing storage media 408, including slower accessing HDDs, sequential access media such as magnetic tape in tape drives and/or optical media, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media (up to and including all SSD storage media) for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

In one particular embodiment, the storage system 400 may include a combination of SSDs and HDDs, with the higher storage tier 402 including SSDs (and possibly some buffer memory) and the lower storage tier 406 including HDDs (and possibly some buffer memory). According to another embodiment, the storage system 400 may include a combination of SSDs and magnetic tape with magnetic tape drives, with the higher storage tier 402 including SSDs (and possibly some buffer memory) and the lower storage tier 406 including magnetic tape (and possibly some buffer memory) and magnetic tape drives for accessing data from the magnetic tapes. In yet another embodiment, the storage system 400 may include a combination of HDDs and magnetic tape, with the higher storage tier 402 including HDDs (and possibly some buffer memory) and the lower storage tier 406 including magnetic tape (and possibly some buffer memory).

Figure 5:
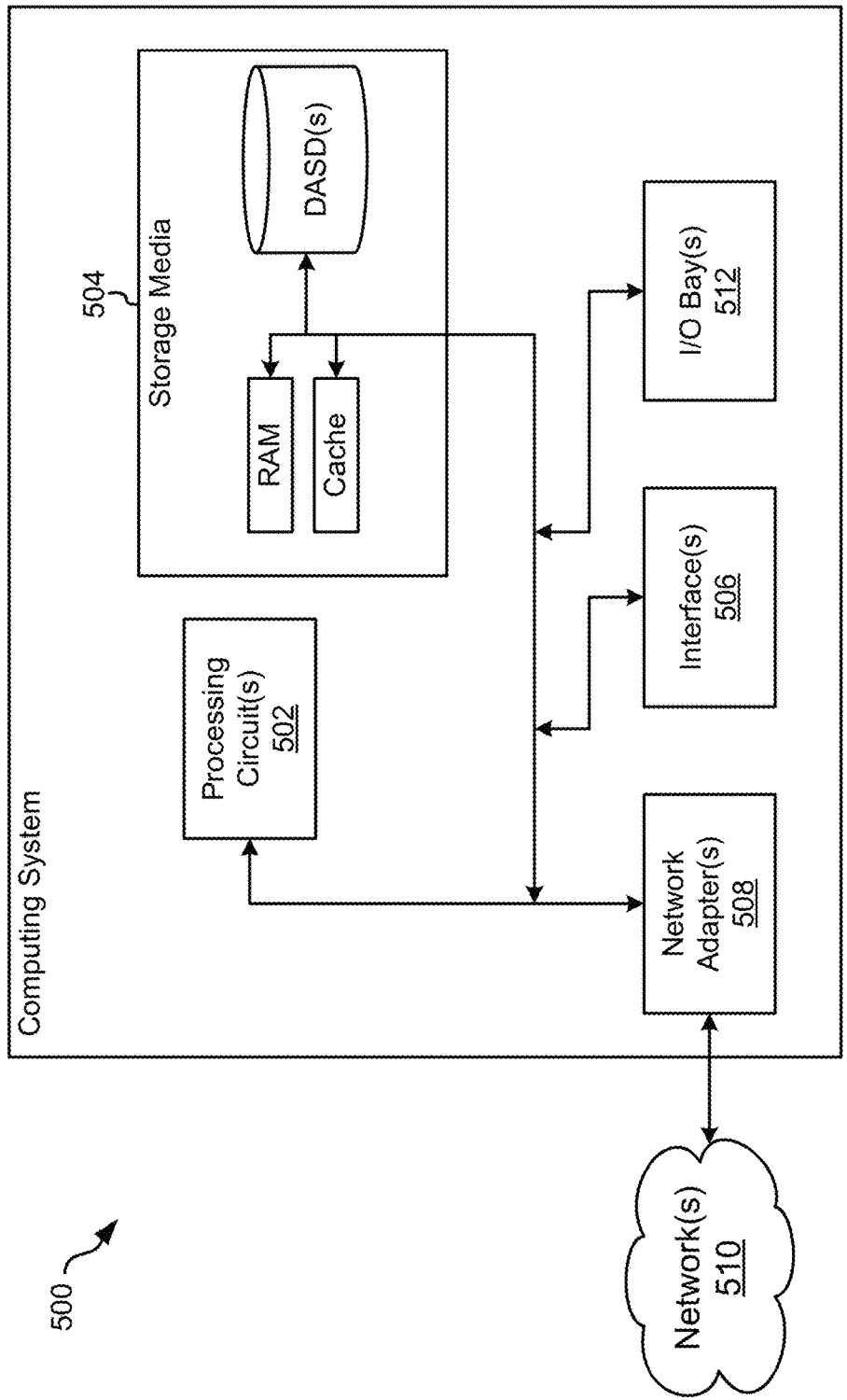
FIG. 5 shows a computing system, according to one embodiment.

Now referring to FIG. 5, a block diagram of a computing system 500 is shown according to one embodiment. The computing system 500 includes a plurality of hardware components, including but not limited to: a hardware processing circuit 502 configured to execute program instructions provided thereto, computer readable storage media 504 coupled with the hardware processing circuit 502 and configured to store data, one or more interfaces 506 configured to couple the computing system 500 with one or more external devices, a network adapter 508 configured to provide a communication channel between the computing system 500 and one or more networks 510, and at least one Input/Output (I/O) bay 512 configured to allow insertion of one or more types of expansion cards therein to increase and/or expand functionality of the computing system 500. Any other hardware components not specifically described herein may also be included in the computing system 500 as would be known to one of skill in the art.

In one embodiment, one or more of the hardware components within the computing system 500 may have redundant components installed in parallel in order to perform redundant functionality in cases where a primary hardware component fails, loses power, etc., and is unavailable to perform its assigned task(s).

For example, two CPUs acting as processing circuits 502 may be installed in the computing system 500, with full redundant backup being provided by a backup CPU for a primary CPU, with failover of functionality to the backup CPU being provided in case of failure of the primary CPU. Of course, more than two processing circuits 502 of any type may be installed in the computing system 500 while maintaining processing redundancy as would be apparent to one of skill in the art.

In another example, two Fibre Channel interface cards (FCICs) may be installed as interfaces 506 in the computing system 500, with full redundant backup being provided by a backup FCIC for a primary FCIC, with failover of functionality to the backup FCIC being provided in case of failure of the primary FCIC. Of course, more than two interfaces 506 of any type may be installed in the computing system 500 while maintaining interface redundancy as would be apparent to one of skill in the art.

The computer readable storage media 504 may include any memory type known in the art, such as non-volatile memory (NVM) storage devices, DASDs, random access memory units, etc. Any suitable NVM storage device(s) may be utilized, such as Flash memory, RAM, erasable programmable read-only memory (EPROM), solid state devices (SSDs), etc. Moreover, any DASDs may be used, such as HDDs, tape media for use with a tape drive, optical drives, etc. Additionally, a cache or buffer may also be present in the computer readable storage media 504 for data staging prior to storage on the computer readable storage media 504. Moreover, the computer readable storage media 504 may be accessible to all processing circuits 502 within the system 500 in a redundant arrangement, in some approaches.

According to one embodiment, a process is described herein that provides for power cycling of hardware components of the computing system 500. This power cycling is performed only when it is determined that it is safe to do so, such that no loss of data or access to the data will occur and performance of the computing system 500 will not be adversely effected as a result of the power cycling. In other embodiments, some performance impact may be experienced when power cycling of hardware components which do not have full redundancy in the computing system 500. However, the power cycling is scheduled to avoid any loss of data or restrictions to access to the data whether redundancy is provided in the computing system 500 or not. These periods where data loss is avoided, access to the data is not restricted, and performance degradation is mitigated or eliminated are referred to herein as "power cycle windows."

In another embodiment, each hardware component may be power cycled periodically during a power cycle window according to a schedule to ensure that at least a subset (or possibly all) of the hardware components included in the computing system 500 are power cycled at least once for every maximum period of time. This maximum period of time is referred to as the "power cycle interval" for the remainder of these descriptions, and may be predetermined and/or dynamically adjusted, and may be set to ensure that a hardware component does not experience a power-up failure between periodic power cycling of the particular hardware component.

In accordance with one embodiment, the power cycle interval may be one month, two weeks, one week, bi-monthly (every two months), or set to some other time period based on the experience of a system administrator having familiarity with past hardware failures in the computing system 500 (e.g., to set the power cycle interval to be shorter than a median, average, or minimal time period observed between power-up failures experienced by the computing system 500, and/or for a certain hardware component of the computing system 500). In other words, the power cycle interval may be set individually for each type of hardware component within the computing system 500, may be set individually for each hardware component within the computing system 500, or may be set universally for all hardware components within the computing system 500.

Moreover, in one embodiment, the power cycle interval may be set according to an established service lifespan for one, some, or all of the hardware components in the computing system 500 individually, by hardware component type, or overall for the entire system 500. For example, in a case where the computer readable storage media 504 includes one or more dual in-line memory modules (DIMMs), an established service lifespan may be 5 years, and therefore the power cycle interval may be set, individually, for each DIMM in the computing system 500 to less than 5 years, e.g., 4 years, 3 years, 2 years, etc., from an installation and/or production date for the corresponding DIMM. In another embodiment, the power cycle interval may be set for all DIMMs in the computing system 500 to less than 5 years from an installation and/or production date for an oldest DIMM used in the computing system 500. Of course, this methodology may be extended to any hardware component of the computing system 500, as would be understood by one of skill in the art upon reading the present descriptions.

In another embodiment, a power cycle may be dictated in response to a similar hardware component experiencing a power-up failure of its own, either during a scheduled power cycling, or unexpectedly during a system restart, reboot, power failure, etc.

The computing system 500 and/or an external device that manages the computing system 500, in one embodiment, may be configured to gather information that describes the hardware components of the computing system 500 and store the gathered information in a component database. Moreover, this database may include information that describes redundancy among the hardware components of the computing system 500, such as by storing in the component information about each hardware component in association with its corresponding redundant hardware component database.

The information may include a name of the hardware component, a function of the hardware component, a manufacturer of the hardware component, a specific computing system in which the hardware component is installed, a last power cycle date for the hardware component, specifications of the hardware component (e.g., size, speed, amount of memory, form factor, revision date, etc., depending on the type of hardware component), etc. Any useful information regarding the hardware component may be stored in the component database, as would be apparent to one of skill in the art upon reading the present descriptions.

The external device that manages the computing system 500 may be a controller, a server, a host, or some other suitable computing device that includes at least one processing circuit therein for execution of program instructions and is coupled to the computing system 500.

Moreover, in a further embodiment, the computing system 500 and/or an external device that manages the computing system 500, may store in the component database a typical, calculated, and/or obtained lifespan for at least some of the hardware components of the computing system 500, an installation date for at least some of the hardware components of the computing system 500, a production date for at least some of the hardware components of the computing system 500, operating time and/or uptime for at least some of the hardware components of the computing system 500, etc. Because some hardware components may degrade even when not being used (e.g., sitting on a shelf waiting to be installed), the expected lifespan of such hardware components may be adjusted to be based on the production date rather than the installation date, which is typically used for hardware component lifespan calculations, in order to account for this premature degradation.

In one embodiment, the computing system 500 and/or an external device that manages the computing system 500, may power cycle one or more of the hardware components of the computing system 500 according to a predetermined schedule, such that all hardware components are power cycled at least once over a set period of time. This set period of time may differ for each hardware component in one embodiment, such as being based on an expected lifespan thereof, or an overall time period may be set for the computing system 500 in an alternate embodiment.

Moreover, redundant hardware components may be power cycled while the computing system 500 is up and running, while non-redundant hardware components may be set to be power cycled during a power cycle window. The power cycle window may be determined as a time when the inoperability of the computing system 500 will have a minimal effect on operations that the computing system 500 is tasked with performing, such as early morning hours (1:00 AM, 2:00 AM, etc.), weekend hours, or some other specified date/time when the computing system 500 may be taken offline.

In another embodiment, a determination may be made that dictates power cycling of one or more hardware components of the computing system 500. In one embodiment, this determination may be based on a lifespan of a particular hardware component. In response to a determination that one or more hardware components are within a predetermined percentage of their expected lifespan, e.g., within 50% of lifespan, within 60% of lifespan, within 75% of lifespan, or some other threshold(s), the one or more hardware components are power cycled. Should any of the components experience a power-up failure after power cycling, the hardware component may then be replaced without subjecting the computing system to unexpected disruptions in the future.

In one approach, several thresholds are preset that are increased in frequency as the hardware component approaches its expected lifespan, e.g., thresholds may be set (of total lifespan) at 50%, 75%, 85%, 90%, 95%, 98%, 100%. Of course, other such thresholds may be used that differ in percentages, as would be understood by one of skill in the art upon reading the present descriptions.

Each time a hardware component passes another threshold, the hardware component may be power cycled at a next power cycle window, thereby providing increased scrutiny of the hardware component as it approaches its expected lifespan. Once its expected lifespan is reached, the hardware component may be replaced, in some approaches.

According to one embodiment, the frequency at which the power cycling is performed may be calculated according to the following equation: $\omega_{PC}=(C*Age)/(Lifespan)$, where $\omega_{PC}$ represents the frequency of power cycling, Age is the age of the hardware component (from installation or from production), Lifespan is an expected lifespan of the hardware component, and C is a positive multiplier which may be greater than, equal to, or less than 1. C may be used to adjust the frequency of power cycling, such as by increasing C for particularly vulnerable hardware components by increasing C greater than 1, decreasing C for particularly reliable hardware components by decreasing C less than 1, or setting C to 1 by default for typical hardware components.

This frequency of power cycling may be calculated and implemented for a particular hardware component, for all of a particular type of hardware component installed in the computing system 500, and/or overall for all hardware components in the computing system 500, in various approaches.

According to one particular embodiment, the methods and techniques described herein may be implemented in a multi-server system, such as an IBM® DS8000 series enterprise server. In such a system, redundancy is provided using duplicated hardware components for each critical hardware component within the system.

Figure 6:
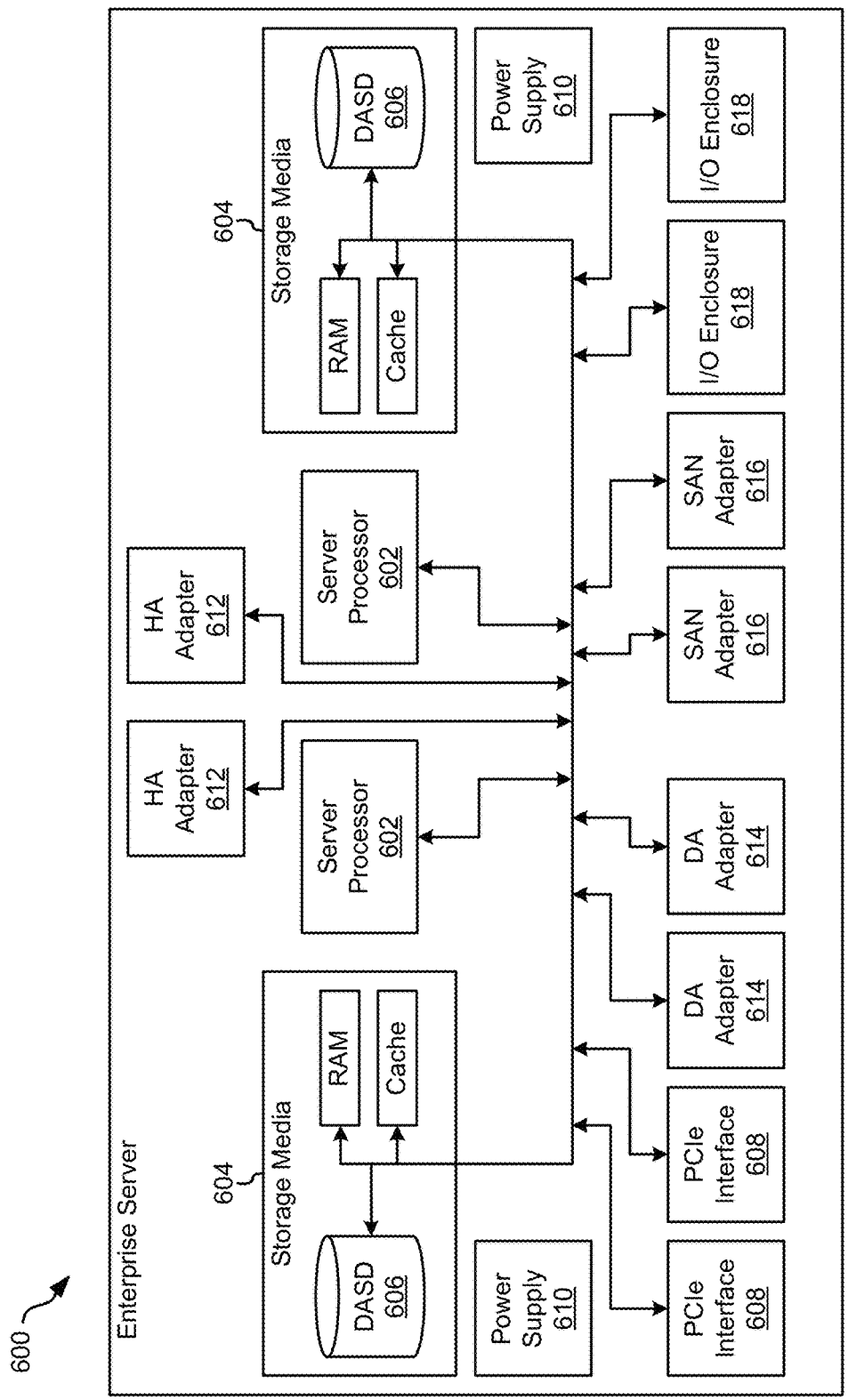
FIG. 6 shows an enterprise server, according to a particular embodiment.

As shown in FIG. 6, according to one embodiment, an IBM® DS8000 series enterprise server 600 includes redundant server processors 602, fully redundant computer readable storage media 604 coupled with the redundant server processors 602, redundant hard disk drives (HDDs) or other direct access storage devices (DASDs) 606, redundant peripheral component interconnect express (PCIe) interface cards 608, redundant power supplies 610, redundant host adapters (HAs) 612 (front-end interfaces), redundant device adapters (DAs) 614 (back-end interfaces), redundant storage area network (SAN) adapters 616, and redundant I/O enclosures 618.

For example, the server 600 may include one or more pairs of central processor complexes (CPCs) providing redundant processing operations (and possibly including multiple-core processors totaling up to 48 cores per CPC), one or more pairs of DDR3 custom dual inline memory modules (CDIMMs) coupled with the redundant CPCs (and possibly including up to 32 CDIMMS having a maximum memory size of at least 1 TB per CPC), one or more pairs of HDDs, one or more pairs of PCIe x16 Gen3 slots, one or more pairs of PCIe x8 Gen3 slots, one or more pairs of power supplies, one or more pairs of HAs, one or more pairs of DAs, one or more pairs of FCICs, and one or more pair of I/O enclosures. This server 600 may be used in conjunction with the methods and techniques described herein for power cycling hardware components to prevent unexpected power-up failures.

In one exemplary embodiment, for power cycling of a first HA and/or DA (first HA/DA) card installed in the server 600, it is ensured that all I/O (access requests that are received and forwarded through the server 600) is able to be routed through a different HA/DA card prior to power cycling the first HA/DA card. Next, the first HA/DA card is quiesced (which may result in flushing access requests, routing outstanding access requests to another HA/DA card, pausing or otherwise putting the first HA/DA card into a consistent state, etc.) and then power cycled, by halting the flow of power to the first HA/DA card from all of the various power supplies within the server 600. A predetermined amount of time is waited without power being supplied to the first HA/DA card (which may be 5 seconds or more, and may be based on an estimated amount of time needed to sufficiently remove power from all components of the first HA/DA card, and may be based on experience with powering down such devices). During this power cycle, all I/O that would normally be handled by the first HA/DA card is routed through a redundant HA/DA card for processing thereof. If the first HA/DA card experiences any problems after the power cycle (a power-up failure), several possible actions may be performed; otherwise, operations within the server 600 continue normally.

In one approach, in response to a power-up failure of the first HA/DA card, an alert may be issued to an administrator indicating the power-up failure for the HA/DA card. In another approach, a work-order may be issued to repair and/or replace the first HA/DA card. In another approach, the first HA/DA card may be replaced. Thereafter, information in the component database for the server 600 is updated to reflect the new HA/DA card information, such as manufacturer, model number, specifications, installation/production date, resetting the operating time to zero, etc. Moreover, power cycling of any other hardware components is halted until a new HA/DA card is made operational and/or the power-up failure is resolved for the first HA/DA card.

In another exemplary embodiment, for power cycling of a first CPC installed in the server 600, two possible methods are possible. In a first method, it is ensured that all I/O (access requests that are received and forwarded through the server 600) is able to be routed through a different CPC prior to power cycling the first CPC. Next, the first CPC is quiesced (which may result in flushing access requests, routing outstanding access requests to another CPC, pausing or otherwise putting the first CPC into a consistent state, etc.) and power cycled, by halting the flow of power to the first CPC from all of the various power supplies within the server 600. A predetermined amount of time is waited without power being supplied to the first CPC (which may be 5 seconds or more, and may be based on an estimated amount of time needed to sufficiently remove power from all components of the first CPC, and may be based on experience with powering down such devices). During this power cycle, all I/O that would normally be handled by the first CPC being power cycled is routed through a redundant CPC for processing thereof. If the first CPC experiences any problems after the power cycle (a power-up failure), several possible actions may be performed.

In another approach, portions of the first CPC may be power cycled in sequence. For example, first the processors for the first CPC may be power cycled one at a time, then the installed memory units one at a time, etc., until all portions of the first CPC are power cycled. This sequence of power cycling all portions of the first CPC is halted if a power-up failure is detected for any portion of the first CPC after power cycling thereof. Thereafter, this portion of the first CPC may be repaired and/or replaced, and then remaining portions of the first CPC may be power cycled until all portions check out without power-up failure.

In yet another approach, an alert may be issued to an administrator indicating the power-up failure for the first CPC. In another approach, a work-order may be issued to repair faulty portions of and/or replace the first CPC. In another approach, portions of the first CPC or the entire first CPC may be replaced. Thereafter, information in the component database for the server 600 is updated to reflect information about the new CPC or portions thereof, such as manufacturer, model number, specifications, installation/production date, resetting the operating time to zero, etc. Moreover, power cycling of any other hardware components is halted until the new CPC is made operational and/or the power-up failure is resolved for the first CPC.

Figure 7:
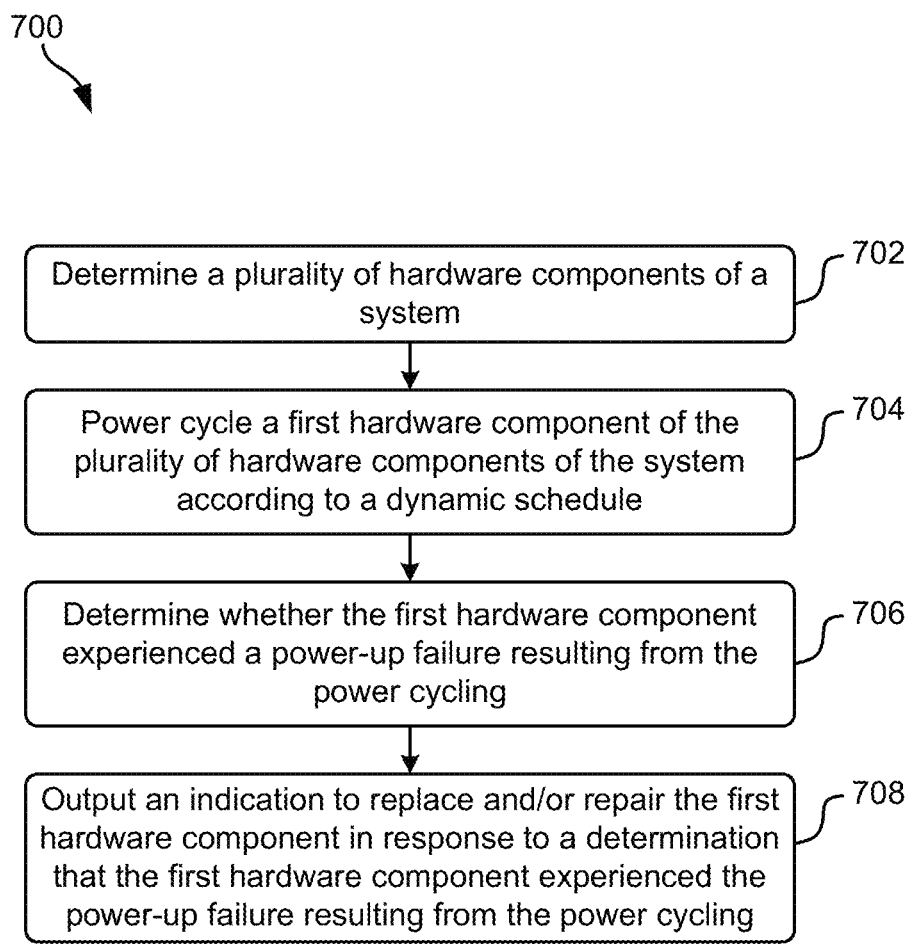
FIG. 7 shows a flowchart of a method, according to one embodiment.

Now referring to FIG. 7, a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 700. Illustrative processors include, but are not limited to, a MPU, a CPU, an ASIC, a FPGA, etc., combinations thereof, or any other suitable computing device known in the art.

As shown in FIG. 7, method 700 may start with operation 702, where a plurality of hardware components of a system are determined, such that these hardware components may be monitored and power cycled periodically thereafter to prevent unexpected power-up failures.

This determination may include, in one embodiment, collecting and recording, such as in a component database, information about some or all of the plurality of hardware components of the system. The information may include, but is not limited to, a name of the hardware components, a function of the hardware components, a manufacturer of the hardware components, a specific computing system in which the hardware components are installed, a last power cycle date for the hardware components, specifications of the hardware components (e.g., size, speed, amount of memory, form factor, revision date, etc., depending on the type of hardware components), etc. Any useful information regarding the hardware components may be stored in the component database, as would be apparent to one of skill in the art upon reading the present descriptions.

In operation 704, a first hardware component of the plurality of hardware components of the system is power cycled according to a dynamic schedule.

The process of power cycling a hardware component may include, in one embodiment, removing power from the hardware component, waiting a predetermined amount of time based on a type of the hardware component (e.g., it may take longer for some hardware components to completely power down than it does for other hardware components), and re-supplying power to the hardware component after waiting the predetermined amount of time. This completes the power cycle, and then the hardware component may be tested to determine whether a power-up failure has occurred after the power cycling.

In operation 706, it is determined whether the first hardware component experienced a power-up failure resulting from the power cycling. Such failures are typically only detectable after powering up the component, making them difficult to detect without removing power from and resuming power to a particular hardware component to determine whether a power-up failure will occur.

In operation 708, an indication is output to replace and/or repair the first hardware component in response to a determination that the first hardware component experienced the power-up failure resulting from the power cycling. In this way, the first hardware component may be evaluated by a technician or some other qualified operator familiar with the first hardware component. A result of the evaluation may dictate replacement of the first hardware component due to the issue being too severe to repair or a repair may be insufficient to rely on for an extended service life after being repaired. In another approach, a result of the evaluation may indicate that the first hardware component may be repaired and put back into service, possibly at a later time if the repairs would take more time than is allotted for the downtime of the first hardware component after the power cycling is performed.

In a further embodiment, method 700 may include routing input and/or output (I/O) requests that are destined for the first hardware component to a first redundant hardware component for processing thereof prior to and during the power cycling of the first hardware component. In this arrangement, the first redundant hardware component is configured to provide full back-up redundancy for the first hardware component within the system, e.g., it is a redundant hardware component which is configured to perform the same tasks and functions as the first hardware component. For example, if the first hardware component is a CPU, the first redundant hardware component is also a CPU or some other processing circuit capable of performing operations like a CPU. Moreover, sending of the I/O requests is resumed to the first hardware component in response to a determination that the first hardware component did not experience the power-up failure after the power cycling, e.g., the first hardware component checked-out and does not need to be replaced and/or repaired.

In another further embodiment, method 700 may include routing I/O requests that are destined for the first redundant hardware component to the first hardware component for processing thereof after resuming sending I/O requests to the first hardware component. Because the first hardware component has checked-out, it may be placed back into service and used normally. In addition, now the first redundant hardware component may be power cycled. Hence, method 700 also includes routing the I/O requests that are destined for the first redundant hardware component to the first hardware component prior to and during the power cycling of the first redundant hardware component, and power cycling the first redundant hardware component after routing the I/O requests that are destined for the first redundant hardware component to the first hardware component. Further, it is determined whether the first redundant hardware component experienced a power-up failure resulting from the power cycling, and an indication is output to replace and/or repair the first hardware component in response to a determination that the first redundant hardware component experienced the power-up failure resulting from the power cycling. In contrast, sending of I/O requests to the first redundant hardware component are resumed in response to a determination that the first redundant hardware component did not experience the power-up failure after the power cycling.

In one embodiment, the determination as to whether the first hardware component experienced the power-up failure resulting from the power cycling comprises receiving results from a power on self test (POST) performed on the first hardware component. This POST may be performed by the first hardware component, by a controller that manages the first hardware component, or by some other component or processing circuit capable of performing such a test on the first hardware component.

In another embodiment, the determination as to whether the first hardware component experienced the power-up failure resulting from the power cycling may include detecting a loss of access to one or more resources available to the first hardware component prior to the power cycling. The one or more resources may include any resources commonly used by the first hardware component, such as memory, processing capacity or access to the processing circuit, an interface to another component or device, etc. In a further embodiment, the loss of access may be to the first hardware component itself, as sometimes a hardware component will not power on at all or for long enough to perform any testing thereof after the power cycling.

In another embodiment, the dynamic schedule of the power cycling of the first hardware component may include periodic power cycling. The period of this schedule is dynamically adjusted. For example, a period of time in which power cycling of the first hardware component takes place is based on one or more factors, including but not limited to: an age of the first hardware component, an installation date of the first hardware component, an operating time of the first hardware component, an expected lifespan of the first hardware component, and a failure of a similar hardware component of the system.

In a specific embodiment, the period of time in which power cycling of the first hardware component takes place may be shortened as the age of the first hardware component approaches the expected lifespan of the first hardware component. Moreover, as the age of the first hardware component gets closer and closer to the expected lifespan, the period of time between power cycles may be reduced further and further. Finally, once the age of the first hardware component reaches the expected lifespan, or some time thereafter, the first hardware component may be caused to be replaced with another hardware component configured to perform the same duties.

Method 700 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 700.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 700.

There are several advantages to the methods and techniques described herein, in various embodiments. New hardware components have power cycling performed very rarely or not at all until reaching a certain age and/or operating time, which limits the disruptions to the user. Moreover, as the hardware component ages, more frequent power cycling is performed, which is more likely to expose power-up failures before an outage takes out several components and the user experiences loss of access, data loss, etc.

In addition, for users who are able to plan outages, some, a significant percentage (e.g., greater than 75%), or all of the hardware components may be power cycled during the outage. This allows for detection and resolution of latent power-up failure issues before resuming operation after the planned power outage.

Without using the methods and techniques described herein, if a user loses power (planned or unplanned), multiple hardware component power-up failures may occur all at once, which may cause a prolonged outage and extended loss of access to data and/or data loss.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining a plurality of hardware components of a system;
   power cycling a first hardware component of the plurality of hardware components of the system according to a dynamic schedule;
   determining whether the first hardware component experienced a power-up failure resulting from the power cycling; and
   outputting an indication to replace and/or repair the first hardware component in response to a determination that the first hardware component experienced the power-up failure resulting from the power cycling;
   routing input and/or output (I/O) requests that are destined for the first hardware component to a first redundant hardware component for processing thereof prior to and during the power cycling of the first hardware component, wherein the first redundant hardware component is configured to provide full back-up redundancy for the first hardware component within the system; and
   resuming sending I/O requests to the first hardware component in response to a determination that the first hardware component did not experience the power-up failure after the power cycling.

2. The method as recited in claim 1, comprising:
   routing I/O requests that are destined for the first redundant hardware component to the first hardware component for processing thereof after resuming sending I/O requests to the first hardware component;
   power cycling the first redundant hardware component after routing the I/O requests that are destined for the first redundant hardware component to the first hardware component;
   determining whether the first redundant hardware component experienced a power-up failure resulting from the power cycling;
   outputting an indication to replace and/or repair the first redundant hardware component in response to a determination that the first redundant hardware component experienced the power-up failure resulting from the power cycling; and
   resuming sending I/O requests to the first redundant hardware component in response to a determination that the first redundant hardware component did not experience the power-up failure after the power cycling.

3. The method as recited in claim 1, wherein the power cycling of the first hardware component comprises:
   removing power from the first hardware component;
   waiting a predetermined amount of time based on a type of the first hardware component; and
   re-supplying power to the first hardware component after waiting the predetermined amount of time.

4. The method as recited in claim 1, wherein the determining whether the first hardware component experienced the power-up failure resulting from the power cycling comprises receiving results from a power on self test (POST) performed on the first hardware component and/or detecting a loss of access to one or more resources available to the first hardware component prior to the power cycling.

5. The method as recited in claim 1, wherein the dynamic schedule of the power cycling of the first hardware component includes periodic power cycling, and wherein a period of time in which power cycling of the first hardware component takes place is based on one or more factors selected from a group comprising: an age of the first hardware component, an installation date of the first hardware component, an operating time of the first hardware component, an expected lifespan of the first hardware component, and a failure of a similar hardware component of the system.

6. The method as recited in claim 5, wherein the period of time in which power cycling of the first hardware component takes place is shortened as the age of the first hardware component approaches the expected lifespan of the first hardware component.

7. A computer program product, the computer program product comprising a computer readable storage medium having program instructions embodied therewith, wherein the computer readable storage medium is not a transitory signal per se, the embodied program instructions being executable by a processing circuit to cause the processing circuit to:
 determine, by the processing circuit, a plurality of hardware components of a system;
 power cycle, by the processing circuit, a first hardware component of the plurality of hardware components of the system according to a dynamic schedule;
 determine, by the processing circuit, whether the first hardware component experienced a power-up failure resulting from the power cycle; and
 output, by the processing circuit, an indication to replace and/or repair the first hardware component in response to a determination that the first hardware component experienced the power-up failure resulting from the power cycle;
 route, by the processing circuit, input and/or output (I/O) requests that are destined for the first hardware component to a first redundant hardware component for processing thereof prior to and during the power cycle of the first hardware component, wherein the first redundant hardware component is configured to provide full back-up redundancy for the first hardware component within the system; and
 resume, by the processing circuit, sending I/O requests to the first hardware component in response to a determination that the first hardware component did not experience the power-up failure after the power cycle.

8. The computer program product as recited in claim 7, wherein the embodied program instructions are further executable by the processing circuit to cause the processing circuit to:
 route, by the processing circuit, I/O requests that are destined for the first redundant hardware component to the first hardware component for processing thereof after resuming sending I/O requests to the first hardware component;
 power cycle, by the processing circuit, the first redundant hardware component after routing the I/O requests that are destined for the first redundant hardware component to the first hardware component;
 determine, by the processing circuit, whether the first redundant hardware component experienced a power-up failure resulting from the power cycling;
 output, by the processing circuit, an indication to replace and/or repair the first redundant hardware component in response to a determination that the first redundant hardware component experienced the power-up failure resulting from the power cycle; and
 resume, by the processing circuit, sending I/O requests to the first redundant hardware component in response to a determination that the first redundant hardware component did not experience the power-up failure after the power cycle.

9. The computer program product as recited in claim 7, wherein the embodied program instructions executable by the processing circuit to cause the processing circuit to power cycle the first hardware component further cause the processing circuit to:
 remove, by the processing circuit, power from the first hardware component;
 wait, by the processing circuit, a predetermined amount of time based on a type of the first hardware component; and
 re-supply, by the processing circuit, power to the first hardware component after waiting the predetermined amount of time.

10. The computer program product as recited in claim 7, wherein the embodied program instructions executable by the processing circuit to cause the processing circuit to determine whether the first hardware component experienced the power-up failure resulting from the power cycle further cause the processing circuit to receive, by the processing circuit, results from a power on self test (POST) performed on the first hardware component and/or detect, by the processing circuit, a loss of access to one or more resources available to the first hardware component prior to the power cycle.

11. The computer program product as recited in claim 7, wherein the dynamic schedule of the power cycle of the first hardware component causes periodic performance of the power cycle, and wherein a period of time in which the first hardware component is power cycled is based on one or more factors selected from a group comprising: an age of the first hardware component, an installation date of the first hardware component, an operating time of the first hardware component, an expected lifespan of the first hardware component, and a failure of a similar hardware component of the system.

12. The computer program product as recited in claim 11, wherein the period of time in which the first hardware component is power cycled is shortened as the age of the first hardware component approaches the expected lifespan of the first hardware component.

13. A system, comprising:
 a processing circuit;
 a memory; and
 logic stored to the memory, that when executed by the processing circuit causes the processing circuit to:
  determine a plurality of hardware components of a system;
  power cycle a first hardware component of the plurality of hardware components of the system according to a dynamic schedule;
  determine whether the first hardware component experienced a power-up failure resulting from the power cycle; and
  output an indication to replace and/or repair the first hardware component in response to a determination that the first hardware component experienced the power-up failure resulting from the power cycle,
  wherein the dynamic schedule of the power cycle of the first hardware component causes periodic performance of the power cycle,
  wherein a period of time in which the first hardware component is power cycled is based on one or more factors selected from a group comprising: an age of the first hardware component, an installation date of the first hardware component, an operating time of the first hardware component, an expected lifespan of the first hardware component, and a failure of a similar hardware component of the system, and wherein the period of time in which the first hardware component is power cycled is shortened as the age of the first hardware component approaches the expected lifespan of the first hardware component.

14. The system as recited in claim 13, wherein the logic further causes the processing circuit to:

route input and/or output (I/O) requests that are destined for the first hardware component to a first redundant hardware component for processing thereof prior to and during the power cycle of the first hardware component, wherein the first redundant hardware component is configured to provide full back-up redundancy for the first hardware component within the system; and resume sending I/O requests to the first hardware component in response to a determination that the first hardware component did not experience the power-up failure after the power cycle.

15. The system as recited in claim 14, wherein the logic further causes the processing circuit to:

route I/O requests that are destined for the first redundant hardware component to the first hardware component for processing thereof after resuming sending I/O requests to the first hardware component;

power cycle the first redundant hardware component after routing the I/O requests that are destined for the first redundant hardware component to the first hardware component;

determine whether the first redundant hardware component experienced a power-up failure resulting from the power cycling;

output an indication to replace and/or repair the first redundant hardware component in response to a determination that the first redundant hardware component experienced the power-up failure resulting from the power cycle; and resume sending I/O requests to the first redundant hardware component in response to a determination that the first redundant hardware component did not experience the power-up failure after the power cycle.

16. The system as recited in claim 13, wherein the logic that causes the processing circuit to power cycle the first hardware component causes the processing circuit to:

remove power from the first hardware component;

wait a predetermined amount of time based on a type of the first hardware component; and re-supply power to the first hardware component after waiting the predetermined amount of time.

17. The system as recited in claim 13, wherein the logic further that causes the processing circuit to determine whether the first hardware component experienced the power-up failure resulting from the power cycle causes the processing circuit to receive, by the processing circuit, results from a power on self test (POST) performed on the first hardware component and/or detect, by the processing circuit, a loss of access to one or more resources available to the first hardware component prior to the power cycle.

* * * * *